US009803602B2

United States Patent
Krueger et al.

(10) Patent No.: US 9,803,602 B2
(45) Date of Patent: Oct. 31, 2017

(54) VALVE

(71) Applicant: Continental Automotive GmbH, Hannover (DE)

(72) Inventors: Thomas Krueger, Themar (DE); Matthias Bleeck, Pentling (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 14/758,344

(22) PCT Filed: Oct. 9, 2014

(86) PCT No.: PCT/EP2014/071687
§ 371 (c)(1),
(2) Date: Jun. 29, 2015

(87) PCT Pub. No.: WO2015/055512
PCT Pub. Date: Apr. 23, 2015

(65) Prior Publication Data
US 2015/0330342 A1 Nov. 19, 2015

(30) Foreign Application Priority Data
Oct. 15, 2013 (DE) .......... 10 2013 220 913

(51) Int. Cl.
*F16K 31/02* (2006.01)
*F02M 51/06* (2006.01)
(Continued)

(52) U.S. Cl.
CPC ........ *F02M 51/061* (2013.01); *F02M 63/005* (2013.01); *F02M 63/0017* (2013.01);
(Continued)

(58) Field of Classification Search
CPC . F02M 51/061; F16K 31/0655; F16K 25/005; F16K 27/029; Y10T 137/87096
(Continued)

(56) References Cited

U.S. PATENT DOCUMENTS 3,511,470 A    5/1970  Beckett et al. ............. 251/121
3,614,061 A *  10/1971 Fitzpatrick ............ F16K 3/0263
                                                    251/327
(Continued)

FOREIGN PATENT DOCUMENTS

CN      101189432 A   5/2008   ............. F04B 27/14
DE       19756103 A1  6/1999   ............. F02M 51/06
(Continued)

OTHER PUBLICATIONS

International Search Report and Written Opinion, Application No. PCT/EP2014/071687, 11 pages, dated Feb. 2, 2015.
(Continued)

*Primary Examiner* — Jessica Cahill
(74) *Attorney, Agent, or Firm* — Slayden Grubert Beard PLLC

(57) ABSTRACT

A valve includes a housing that surrounds a fluid outlet, a valve element with a longitudinal axis, a valve seat body that surrounds a fluid inlet and which has a sealing seat such that the valve is closed when the valve element bears against the sealing seat and which is coupled to the housing. The valve element is movable relative to the valve seat body in a direction of the longitudinal axis to enable a fluid flow from the fluid inlet to the fluid outlet, the valve seat body surrounds a guide surface to which the valve element is coupled in order to guide the movement of the valve element, and the valve seat body is formed from a harder material than the housing.

8 Claims, 1 Drawing Sheet

(51) Int. Cl.
*F16K 31/06* (2006.01)
*F16K 25/00* (2006.01)
*F16K 27/02* (2006.01)
*F02M 63/00* (2006.01)

(52) U.S. Cl.
CPC .... *F02M 63/0033* (2013.01); *F02M 63/0071* (2013.01); *F02M 63/0078* (2013.01); *F16K 25/005* (2013.01); *F16K 27/029* (2013.01); *F16K 31/0655* (2013.01); *F02M 2200/9053* (2013.01); *F02M 2200/9069* (2013.01); *Y10T 137/87096* (2015.04)

(58) Field of Classification Search
USPC .................................. 251/368, 359; 123/490
See application file for complete search history.

(56) References Cited

U.S. PATENT DOCUMENTS

| | | | | |
|---|---|---|---|---|
| 3,767,164 A | * | 10/1973 | Robinson | F16K 47/04 251/122 |
| 5,803,361 A | * | 9/1998 | Horiuchi | F02M 47/027 239/533.8 |
| 6,152,421 A | * | 11/2000 | Suzuki | F16K 29/00 251/129.15 |
| 6,170,767 B1 | | 1/2001 | Herold et al. | 239/585.3 |
| 6,619,269 B1 | * | 9/2003 | Stier | F02M 51/0671 123/467 |
| 7,505,846 B2 | * | 3/2009 | Stoecklein | F02D 41/2096 123/490 |
| 7,828,264 B2 | | 11/2010 | Iwa | 251/122 |
| 2003/0067217 A1 | * | 4/2003 | Saenz | B60T 8/363 303/113.1 |
| 2004/0238780 A1 | * | 12/2004 | Gethmann | F16K 1/422 251/359 |
| 2007/0079878 A1 | * | 4/2007 | Buchberger | F02M 63/005 137/538 |
| 2012/0112105 A1 | | 5/2012 | Burkart et al. | 251/129.15 |
| 2013/0180607 A1 | * | 7/2013 | Graspeuntner | F02M 63/0028 137/540 |

FOREIGN PATENT DOCUMENTS

| | | | |
|---|---|---|---|
| DE | 102012016428 A1 | 2/2014 | ............. F16K 1/34 |
| EP | 2444652 A2 | 4/2012 | ............. F02M 63/00 |
| JP | 0459865 A | 2/1992 | ............. C08K 3/34 |
| JP | 0622668 U | 3/1994 | ............. F16K 1/42 |
| JP | 2008057430 A | 3/2008 | |
| JP | 2013100756 A | 5/2013 | |
| WO | 2014/206601 A1 | 12/2014 | ............. F02M 59/46 |
| WO | 2014/206764 A1 | 12/2014 | ............. F02M 63/00 |
| WO | 2015/055512 A1 | 4/2015 | ............. F02M 63/00 |

OTHER PUBLICATIONS

Korean Office Action, Application No. 2017004424918, 8 pages, dated Jan. 18, 2017.
Chinese Office Action, Application No. 201480007038.X, 12 pages, dated Dec. 16, 2016.
Korean Notice of Allowance, Application No. 2017049180938, 3 pages. Jul. 14, 2017.

* cited by examiner

VALVE

CROSS-REFERENCE TO RELATED APPLICATIONS

This application is a U.S. National Stage Application of International Application No. PCT/EP2014/071687 filed Oct. 9, 2014, which designates the United States of America, and claims priority to DE Application No. 10 2013 220 913.4 filed Oct. 15, 2013, the contents of which are hereby incorporated by reference in their entirety.

TECHNICAL FIELD

The invention relates to a valve, in particular a valve for a fuel injection system for internal combustion engines of motor vehicles.

BACKGROUND

Valves in fuel injection systems are subject to intense loads as they are exposed, for example, to pressures of 2000 bar or higher. In the case of valves which have electromagnetic actuators, use is often made, for magnetic reasons, of a relatively soft material. Said soft material is protected against the high pressure and against wear by way of additional components.

SUMMARY

One embodiment provides a valve comprising a housing which surrounds a fluid outlet, a valve element with a longitudinal axis, a valve seat body which surrounds a fluid inlet and which has a sealing seat, such that the valve is closed when the valve element bears against the sealing seat, and which is coupled to the housing, wherein the valve element is movable relative to the valve seat body in the direction of the longitudinal axis in order to permit a fluid flow from the fluid inlet to the fluid outlet, wherein the valve seat body surrounds a guide surface to which the valve element is coupled for the guidance of the movement of the valve element, and wherein the valve seat body is formed from a harder material than the housing.

In a further embodiment, the coupling between the guide surface and the valve element is designed for an ingress of the fluid between the guide surface and the valve element.

In a further embodiment, the valve element has, at least in the region of the guide surface as viewed along the longitudinal axis, a recess for a fluid flow from the fluid inlet to the fluid outlet.

In a further embodiment, the valve seat body has a fluid line, which is oriented transversely with respect to the longitudinal axis, for a fluid flow from the fluid inlet to the fluid outlet.

In a further embodiment, the valve seat body surrounds a fluid chamber at the sealing seat by way of a wall such that a fluid jet strikes the wall when the fluid flow from the fluid inlet to the fluid outlet is permitted.

In a further embodiment, the valve comprises an electromagnetic actuator which is arranged on the housing and which is coupled to the valve element in order to move the valve element in the direction of the longitudinal axis.

BRIEF DESCRIPTION OF THE DRAWINGS

Example embodiments are described in further detail below with reference to the figures, in which.

DETAILED DESCRIPTION

Figure 1:
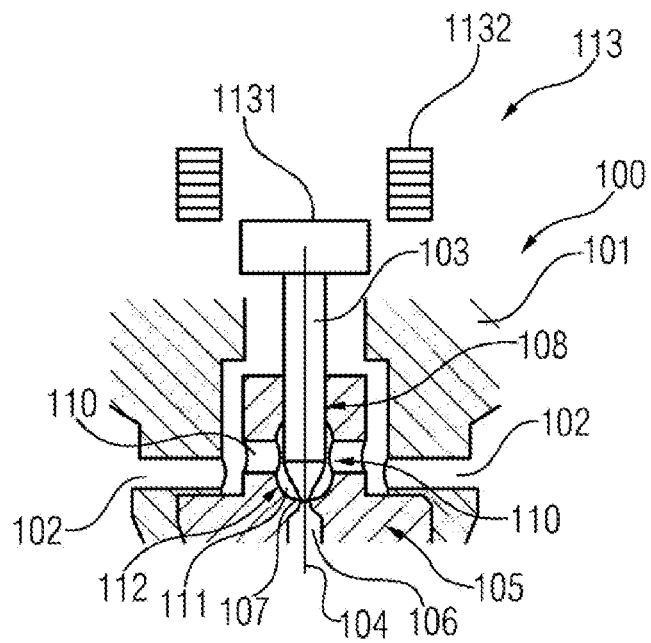
FIG. 1 is a schematic illustration of a valve according to embodiments.

Embodiments of the invention provide a valve which permits reliable operation and which is in particular inexpensive to produce.

In one embodiment, a valve comprises a housing which surrounds a fluid outlet. The valve comprises a valve element with a longitudinal axis. The valve furthermore has a valve seat body. The valve seat body surrounds a fluid inlet and has a sealing seat, such that the valve is closed when the valve element bears against the sealing seat. The valve seat body is coupled to the housing. The valve element is movable relative to the valve seat body in the direction of the longitudinal axis in order to permit a fluid flow from the fluid inlet to the fluid outlet. The valve seat body surrounds a guide surface to which the valve element is coupled for the guidance of the valve element. The valve seat body is formed from a harder material than the housing.

The valve may be used in particular as a valve in a fuel injection system of an internal combustion engine. The valve is used for example as a pressure-limiting valve. The valve remains closed up to a particular predefined pressure and opens above said pressure, such that fluid can pass from the fluid inlet through the valve seat body to the fluid outlet. From there, the fluid flow is for example back in the direction of a fluid tank.

The valve element, which is for example the form of a pin or a valve needle, is coupled in particular to an electromagnetic actuator. The electromagnetic actuator is designed to move the valve element relative to the valve seat body along the longitudinal axis, such that the valve element moves away from the sealing seat. The electromagnetic actuator is coupled to the housing. The housing is formed from a relatively soft material, in particular in order to permit reliable operation of the electromagnetic actuator. The housing conducts the fluid on the low-pressure side. The housing does not conduct the fluid charged with a high pressure of 2000 bar or higher.

The valve seat body is formed from a harder material than the housing. The valve seat body surrounds the fluid inlet in which fluid with a pressure of up to 2000 bar or higher can be conducted.

The valve seat body is furthermore in contact with the valve element for the guidance of the valve element. Thus, the valve element is guided by the valve seat body which is formed from the relatively hard material. In particular, the material of the housing is of lower hardness than the valve seat body. The valve element is guided in the hard material, whereby guidance wear is prevented. In this way, the accuracy and the reliability of the valve are increased even over a relatively long period of operation. Furthermore, the sealing seat and the guide are formed in the same valve seat body, such that fewer tolerances arise. In this way, manufacturing accuracy is increased, as the elements whose position must be precisely adhered to are integrated and arranged on a common axis.

A hard material is to be understood in particular to mean a mechanically hard material, that is to say a material which is more difficult to deform than a relatively soft material. A soft material encompasses in particular magnetically soft materials.

A relatively hard material may for example be a martensitic steel, comprising in particular the following elements: Cr, C, Mn, Si, P, S and Mo. In this case, the material composition may in particular be as follows: 16-18% Cr, 0.6-1.2% C, ≤1% Mn, ≤1% Si, ≤0.04% P, ≤0.03% S, ≤0.75% Mo. The relatively hard material may for example be steel with the SAE designation 440. The relatively hard steel has for example a Rockwell hardness of C50 or higher, for example between C50 and C70, in particular between C55 and C66, including the extreme values.

The relatively soft material is preferably a magnetic material. The relatively hard material may be a non-magnetic material.

In particular, the relatively soft material may be a ferritic steel, comprising in particular the following elements: Cr, C, Mn, Si, P and S, and possibly additionally Ni or Mo. In this case, the material composition may in particular be as follows: 16-18% Cr, ≤0.75% Ni, ≤0.12% C, ≤1% Mn, ≤1% Si, ≤0.04% P and ≤0.03% S. The relatively soft material may for example be steel with the SAE designation 430. The relatively soft steel may for example have a Rockwell hardness of B100 or lower, for example between B70 and B100, in particular between B80 and B90, including the extreme values.

In further embodiments, the coupling between the guide surface and the valve element permits an ingress of fluid along the valve element and the guide surface. The guidance of the valve element in the valve seat body does not exhibit a sealing action.

In embodiments, the valve element has, at least in the region of the guide surface as viewed along the longitudinal axis, a recess for a fluid flow from the fluid inlet to the fluid outlet. By means of the recess, it is possible, when the valve is open, for fluid to be conducted along the longitudinal axis through the guide region at the guide surface. The recess extends in the direction away from the sealing seat, in particular beyond the sealing seat body. In this way, a reliable and rapid discharge of fluid to the fluid outlet is made possible.

In further embodiments, the valve seat body has a fluid line, which is oriented transversely with respect to the longitudinal axis, for a fluid flow from the fluid inlet to the fluid outlet. In the valve is open, it is possible for the fluid to pass from the fluid inlet to the fluid outlet through the fluid line. In embodiments, the valve has either the recess in the valve element or the fluid line in the valve seat body, but not both. In further embodiments, the valve has both the recess in the valve element and the fluid line in the valve seat body.

In further embodiments, the valve seat body has a fluid chamber at the sealing seat with a wall. A liquid jet strikes the wall when the fluid flow from the fluid inlet to the fluid outlet is permitted. When the valve opens, the intense liquid jet from the high-pressure side to the low-pressure side is generated. The jet strikes the wall of the valve seat body composed of the relatively hard material. The valve seat body is subject to less wear than the relatively soft material. Furthermore, it is possible to dispense with further components for protection against the liquid jets. Thus, simple and inexpensive production, and reliable operation with little wear, are possible.

FIG. 1 schematically shows a valve 100 in a cross-sectional view. The valve 100 comprises a housing 101 and a valve seat body 105. The valve seat body 105 is coupled to the housing 101. The valve seat body 105 is arranged in particular in a recess of the housing 101. The valve 100 is for example a pressure-limiting valve in a fuel injection system.

The valve seat body 105 surrounds a fluid inlet 106. The fluid inlet 106 is for example hydraulically coupled to a fuel line that conducts high pressure or to a pressure accumulator. In particular, pressures of higher than 2000 bar are encountered on the high-pressure side. The valve seat body 105 has a sealing seat 107. The sealing seat is arranged at one end of the fluid inlet 106. The valve seat body 105 has a guide surface 108 on a region facing away from the fluid inlet 106. The guide surface 108 is in particular cylindrical. The valve seat body 105 furthermore surrounds a fluid chamber 111. The fluid chamber 111 is arranged between the sealing seat 107 and the guide surface 108. In embodiments, the valve seat body 105 surrounds a fluid line 110. The fluid line 110 is in particular a bore or multiple bores. The fluid line 110 is arranged between the guide surface 108 and the sealing seat 107.

The housing 101 surrounds a fluid outlet 102 which is arranged downstream of the fluid line 110.

The valve 100 furthermore has a valve element 103. The valve element 103 is in particular an elongate valve pin or an elongate valve needle which extends along a longitudinal axis 104.

The valve element 103 is coupled to the valve seat body 105. The valve element 103 is arranged, in regions, within the valve seat body 105. The valve element 103 is movable relative to the valve seat body 105 along the longitudinal axis 104. A movement of the valve element 103 relative to the valve seat body 105 is guided by the guide surface 108. In the closed state of the valve, the valve element 103 is in contact, by way of one end, with the sealing seat 107. With an opposite end, the valve element 103 is coupled to an actuator 113. The actuator is in particular an electromagnetic actuator. It comprises, in particular, a magnet coil 1132 and an armature 1131. The actuator 113 is in particular fastened to the housing 101. The actuator 113 is designed to move the valve element 103 along the longitudinal axis 104 in a direction away from the sealing seat 107. In particular, the armature 1131 can be deflected in its direction when the magnet coils 1132 are energized.

The valve seat body 105 is composed of a material which is harder than the material from which the housing 101 is formed. In particular, the valve seat body 105 is composed of a harder material than the housing 101. In particular, the valve seat body 105 is of greater hardness than the housing 101. In particular, it is not necessary to take magnetic characteristics into consideration in the selection of the material for the valve seat body 105. The material is selected primarily with regard to low wear. The material of the housing 101 is selected with regard to its magnetic characteristics, as the electromagnetic actuator 113 is coupled to the housing 101.

The guide surface 108 for the valve element 103 is part of the valve seat body 105 composed of the relatively hard material. The valve seat body 105 experiences only low guidance wear in guiding the valve element 103.

During operation, fluid at a high pressure prevails at the fluid inlet 106. If the pressure exceeds a predefined value or if the actuator is actuated, the valve element 103 lifts from the sealing seat 107. Thus, a fluid flow from the fluid inlet 106 to the fluid outlet 102 is permitted. A fluid jet is thus generated between the tip of the valve element 103 and the sealing seat 107. Said high-pressure jet strikes a wall 112 of the fluid chamber 111. Since the fluid chamber 111 is formed in the valve seat body 105 which is composed of the hard material, only low wear occurs as a result of the jet striking the wall 112. The fluid passes from the fluid chamber 111 through the fluid line 110 to the fluid outlet 102.

In the valve 100, the sealing seat 107 and the wall 112 are realized in a single common component. Further components for protection against the fluid jet can be omitted. The guide surface 108 and the valve seat 107 are realized in a single common component. Thus, few manufacturing tolerances arise. In particular, the guide surface 108, the sealing seat 107 and the wall 112 are realized in a single common component. This makes it possible for the valve 100 to be manufactured at low cost and in a precise manner. Owing to the omission of additional components for protection against the high pressure, the valve is inexpensive. The valve 100 is subject to only low wear in the fluid chamber 111 by the fluid jet. Furthermore, the valve seat body 105 is subject to low wear in guiding the valve element 103.

Figure 2:
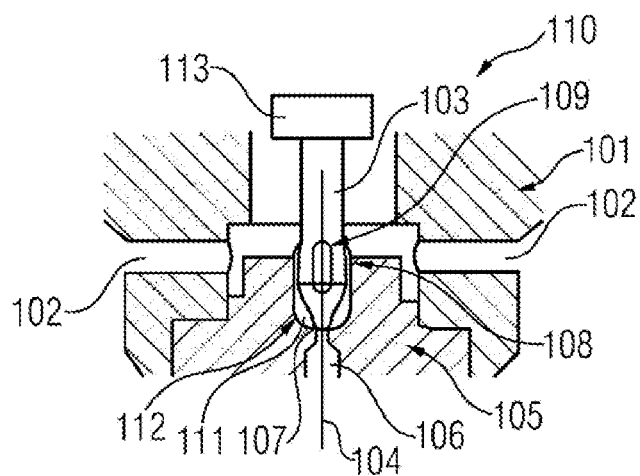
FIG. 2 is a schematic illustration of a valve according to embodiments.

FIG. 2 shows the valve 100 according to further embodiments. The valve 100 according to FIG. 3 corresponds substantially to the embodiments discussed in conjunction with FIG. 1. By contrast to the embodiments of FIG. 1, the valve 100 according to the exemplary embodiments of FIG. 2 does not have a fluid line 110. Instead, a recess 109 or a multiplicity of recesses 109 is provided in the valve element 103.

Figure 3:
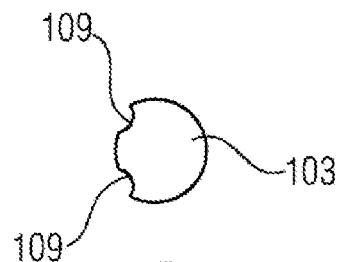
FIG. 3 shows a cross section through a valve element according to embodiments.

FIG. 3 shows the valve element 103 of FIG. 2 in a cross section transversely with respect to the longitudinal axis 104. The recess 109 is formed laterally into the valve element 103 in the direction of the longitudinal axis 104. When the valve is opened, the fluid is guided through the recess 109 from the fluid chamber 111 to the fluid outlet 102. It is thus possible to dispense with the bores 110 in the valve seat body 105. The recess 109 extends beyond the guide surface 108, in particular on a side facing away from the sealing seat 107. A reliable fluid flow through the recess 109 is thus realized.

What is claimed is:

1. A valve, comprising:
  a housing that surrounds a fluid outlet, the housing comprising a magnetic material,
  a valve element having a longitudinal axis,
  a valve seat body that surrounds a fluid inlet and which has a sealing seat, wherein the valve is closed when the valve element bears against the sealing seat, and wherein the valve seat body is coupled to the housing,
  a guide surface of the valve seat body, the guide surface surrounding the valve element and restraining transverse movement of the valve element as it moves along the longitudinal axis,
  wherein the valve seat body comprises a non-magnetic material harder than the housing material, and
  wherein the valve element permits a fluid flow from the fluid inlet to the fluid outlet when it moves away from the sealing seat along the longitudinal axis,
  wherein the valve element includes, in the region of the guide surface as viewed along the longitudinal axis, a recess for a fluid flow from the fluid inlet to the fluid outlet.

2. The valve of claim 1, wherein the coupling between the guide surface and the valve element does not seal against a flow of the fluid between the guide surface and the valve element.

3. The valve of claim 1, wherein the valve seat body surrounds a fluid chamber at the sealing seat via a wall such that a fluid jet strikes the wall when the fluid flow from the fluid inlet to the fluid outlet is permitted.

4. The valve of claim 1, comprising:
  an electromagnetic actuator arranged on the housing and coupled to the valve element to move the valve element in a direction of the longitudinal axis.

5. A fuel injection system of an internal combustion engine, the fuel injection system comprising:
  a plurality of valves, each valve comprising:
    a housing that surrounds a fluid outlet,
    a valve element having a longitudinal axis,
    a valve seat body that surrounds a fluid inlet and which has a sealing seat, wherein the valve is closed when the valve element bears against the sealing seat, and wherein the valve seat body is coupled to the housing,
    a guide surface of the valve seat body, the guide surface surrounding the valve element and restraining transverse movement of the valve element as it moves along the longitudinal axis, and
    wherein the valve element permits a fluid flow from the fluid inlet to the fluid outlet when it moves away from the sealing seat along the longitudinal axis,
    wherein the valve seat body is formed from a harder material than the housing,
  wherein for each valve, the valve element includes, in the region of the guide surface as viewed along the longitudinal axis, a recess for a fluid flow from the fluid inlet to the fluid outlet.

6. The fuel injection system of claim 5, wherein for each valve, the coupling between the guide surface and the valve element does not seal against a flow of the fluid between the guide surface and the valve element.

7. The fuel injection system of claim 5, wherein for each valve, the valve seat body surrounds a fluid chamber at the sealing seat via a wall such that a fluid jet strikes the wall when the fluid flow from the fluid inlet to the fluid outlet is permitted.

8. The fuel injection system of claim 5, wherein each valve comprises an electromagnetic actuator arranged on the housing and coupled to the valve element to move the valve element in a direction of the longitudinal axis.

* * * * *